United States Patent [19]
Akiyama

[11] Patent Number: 5,204,744
[45] Date of Patent: Apr. 20, 1993

[54] SYSTEM FOR REPRODUCING A STATIONARY PICTURE

[75] Inventor: Toru Akiyama, Saitama, Japan

[73] Assignee: Pioneer Electronic Corporation, Tokyo, Japan

[21] Appl. No.: 637,734

[22] Filed: Jan. 7, 1991

[30] Foreign Application Priority Data
  Jul. 4, 1990 [JP] Japan .................. 2-178249

[51] Int. Cl.⁵ .................. H04N 7/01; H04N 3/40; H04N 5/253
[52] U.S. Cl. .................. 358/140; 358/215
[58] Field of Search .............. 358/215, 214, 54, 140, 358/142, 146, 147, 160, 312; 360/9.1, 10.1, 35.1

[56] References Cited
U.S. PATENT DOCUMENTS

4,677,500 6/1987 van Lier .................. 358/342
4,709,277 11/1987 Ninomiya et al. .................. 360/14.3
4,876,596 10/1989 Faroudja .................. 358/140

Primary Examiner—James J. Groody
Assistant Examiner—Safet Metjahic
Attorney, Agent, or Firm—Nikaido, Marmelstein, Murray & Oram

[57] ABSTRACT

A frame number and an instruction signal are inserted in each frame in a video signal. The instruction signal is selected from a predetermined number of field combination instructing signals in each frame, each of the signals represents a combination mode of two fields in the frame. The frame number and the field combination instructing signal are detected. In response to a still signal, a detected frame number and a picture in two fields instructed by a detected field combination instructing signal are stored in a memory for reproducing the picture.

3 Claims, 8 Drawing Sheets

FIG.8
PRIOR ART a  VIDEO SIGNAL
b  PICTURE NUMBER
c  FIELD SIGNAL
   STILL INSTRUCTION
d  MEMORY WRITE ENABLE
   SIGNAL

SYSTEM FOR REPRODUCING A STATIONARY PICTURE

BACKGROUND OF THE INVENTION

The present invention relates to a system for reproducing a stationary picture, such as a system for recording information from a motion picture on a recording medium as a still picture and reproducing the information from the recording medium.

Figure 6:
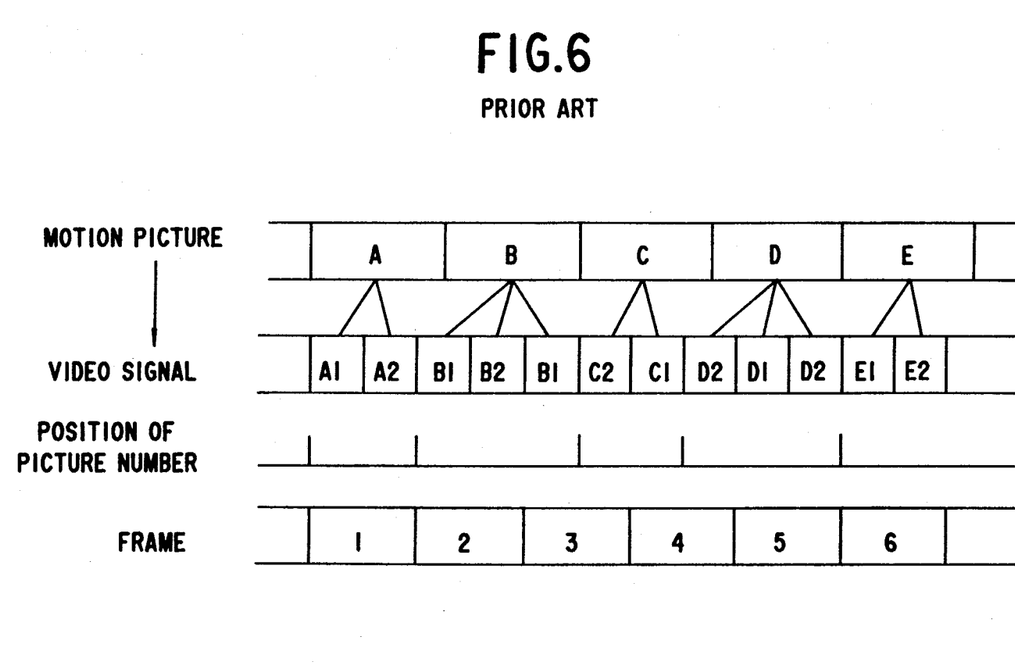
FIG. 6 is a timing chart of a conventional reproducing system.

In order to reproduce the information of the motion picture as a stationary picture, a system, for example, shown in FIG. 6 is used. In the motion picture, the feeding speed of the picture frames is twenty-four frames per second. On the other hand, the number of frames of the video disk is thirty frames per second. Accordingly, for example, the frames A, C, E, of the motion picture correspond to fields (A1, A2), (C2, C1), (E1, E2) of the video signal, respectively. The frames B, D correspond to the fields (B1, B2, B1), (D1, D2, D1) of the video signal, respectively. Namely, in the conventional video disk (LD), two or three adjacent fields in picture number are used as one frame to obtain a still picture of the frame. Here, letters A to E represent frames of respective pictures, and suffixes 1 and 2 represent field numbers of the video. Further, the picture number, as addresses representing each frame, is set at the head of each of the fields A1, B1, C2, D2, E1. Namely, the picture number is positioned regardless of the position of the frame as a unit of the video signal.

Operation of the conventional system will be described with reference to a block diagram of FIG. 7 and a timing chart of FIG. 8.

Figure 7:
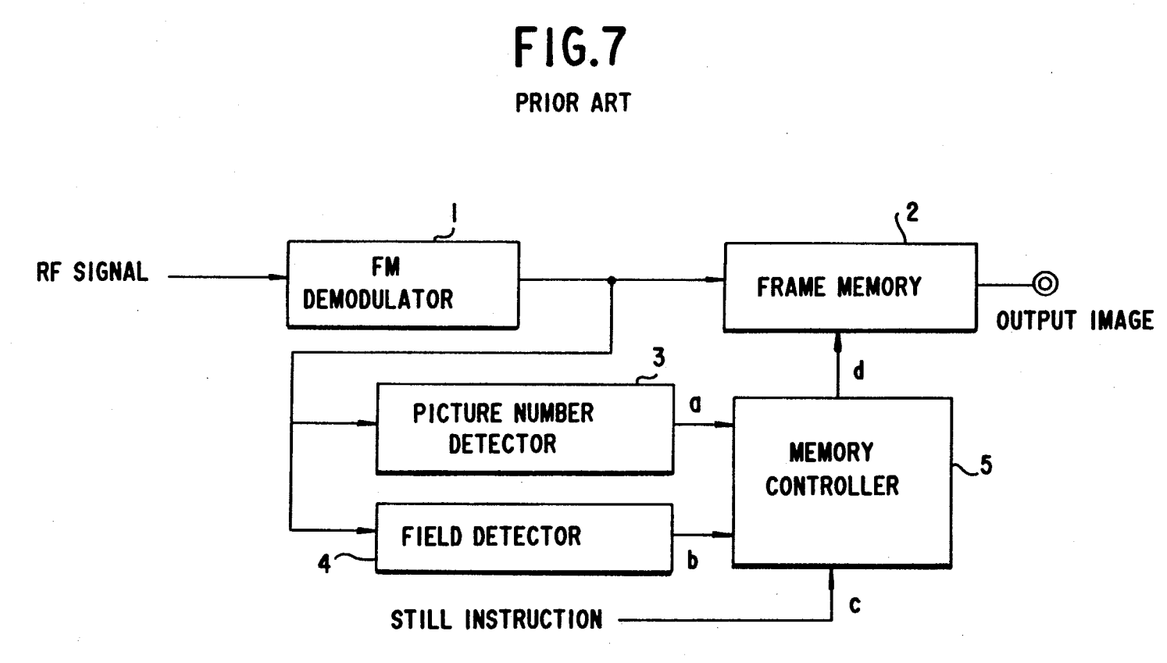
FIG. 7 is a block diagram of the conventional system.

As shown in FIG. 7, a reproduced RF signal is demodulated into a video signal in an FM demodulator 1. The video signal is applied to a frame memory 2 for obtaining a still picture and further to a picture number detector 3 for detecting a picture number a and a field signal detector 4 for detecting a field signal b. The detected signals a and b are applied to a memory controller 5 which is applied with a still instruction c. The still instruction c becomes a high level when a still picture is required. The controller 5 produces a memory write enable signal d which is applied to the frame memory 2 controlling the writing operation.

Figure 8:
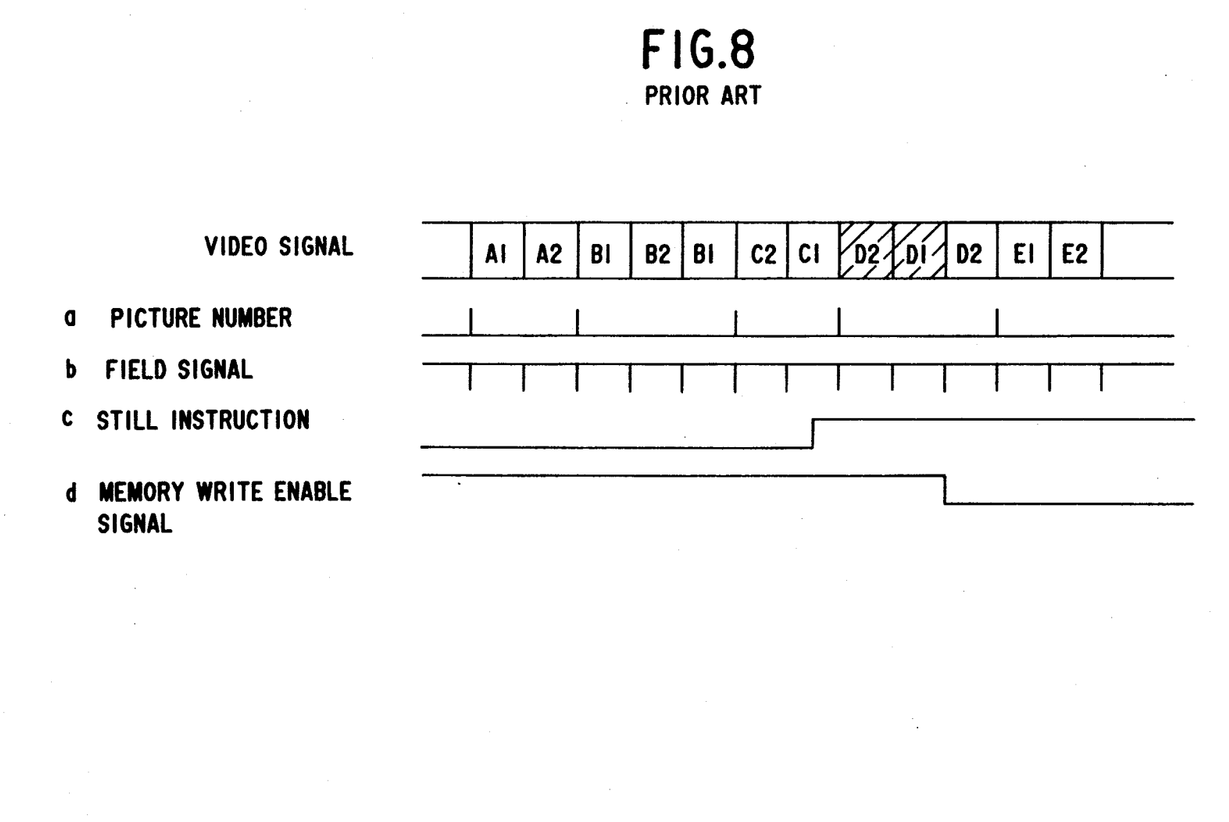
FIG. 8 is a timing chart showing the operation of the conventional system.

As shown in FIG. 8, when the still instruction c is applied, the write enable signal d becomes a low level at the end of the second field from the picture number immediately after the still instruction c, thereby inhibiting the writing in the frame memory 2. Thus, the memory 2 produces an image in the frame (video signals D1, D2).

However, in the conventional system, since the picture number is positioned at the head of the field regardless of the frame, it is not determined which of the fields of the video signal is designated by the picture number. Therefore, it is difficult to read an address signal in a random access operation. Since the address signal does not correspond to each of the frames, the picture does not coincide with the actual time. In particular, if the film source is mixed with a video source, the operation can not be controlled.

SUMMARY OF THE INVENTION

The object of the present invention is to provide a system in which a frame number and a field combination instructing signal for a stationary picture is set at a predetermined position of the frame, thereby facilitating the controlling of the system for obtaining a stationary picture.

According to the present invention, there is provided a system for reproducing a video signal in a frame comprising a first and second fields as a stationary picture, comprising first device for inserting a frame number in each of the frame as an address, a second device for inserting an instruction signal selected from a predetermined number of field combination instructing signals in each frame, each of the signals represents a combination mode of two fields in the frame, a detector for detecting the frame number and the field combination instructing signal, memory responsive to a still signal for storing a detected frame number and a picture in two fields instructed by a detected field combination instructing signal for reproducing the picture.

The other objects and features of this invention will become understood from the following description with reference to the accompanying drawings.

DETAILED DESCRIPTION OF THE PREFERRED EMBODIMENTS

In the system of the present invention, in order to discriminate the frame, a field combination instructing signal is inserted in the head of each frame. As described above, in the conventional system, the head of the picture is indicated by the picture number. In the system of the present invention, the instruction signal is set at the head of each frame in order to instruct the mode of the combination of fields.

The instruction signals are provided to provide the following three combination modes:

Combination 1: First and second fields of the first frame immediately after the still instruction are combined as one frame.

Combination 2: The second field of the first frame immediately after the still signal and a first field of the second frame after the first frame are combined as one frame.

Combination 3: Neither of the fields of the first frame are combined, and the first field and a second field of the second frame are combined.

Figure 1:
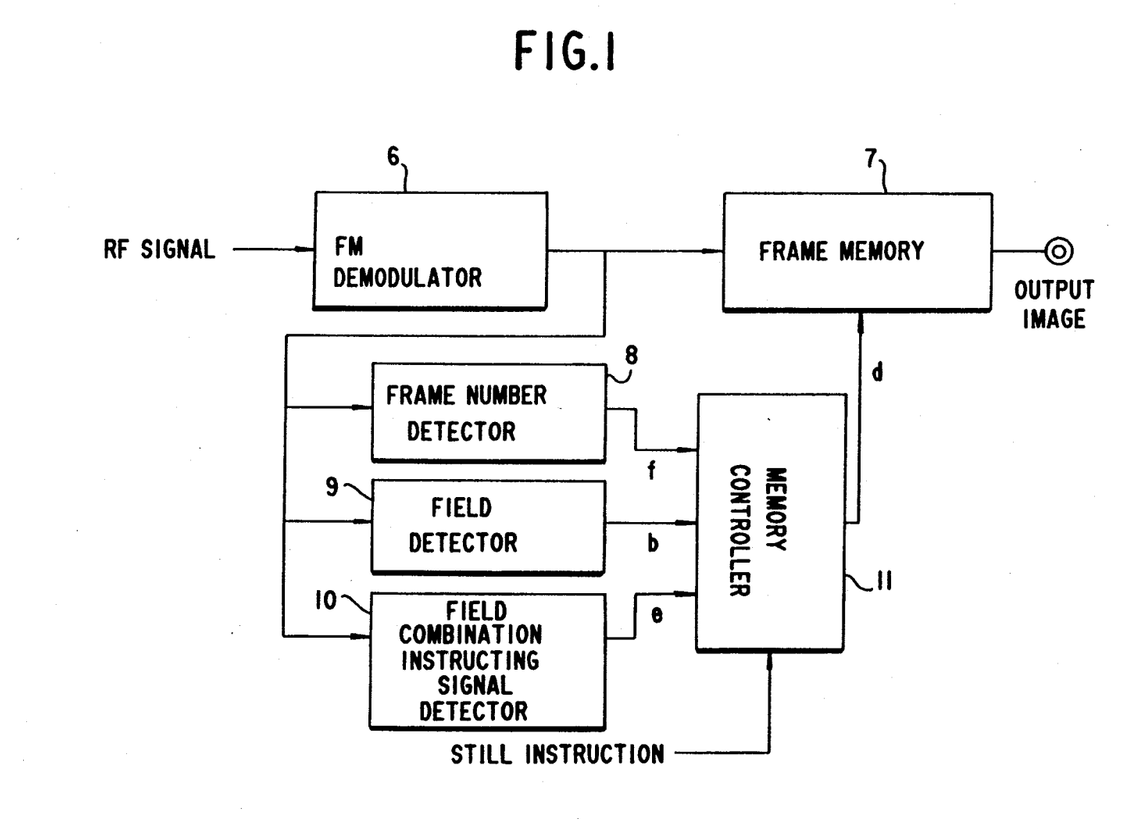
FIG. 1 is a block diagram showing a reproducing system according to the present invention.

Referring to FIG. 1 showing a system of the present invention, the system is provided with an FM demodulator 6, a frame memory 7, a frame number detector 8, a field detector 9, a field combination instructing signal detector 10, and a memory controller 11. The FM demodulator 6 demodulates the RF signal and produces the video signal which is applied to the frame memory 7. The video signal is further applied to the detectors 8, 9 and 10 for detecting a frame number f, the field signal b and a field combination instructing signal e, respectively. These signals f, b and e are applied to the memory controller 11 for producing the memory write enable signal d. The signal d is applied to the frame memory 7 in which the video signal of one frame at the time when the write enable signal d is received is written.

Figure 2:
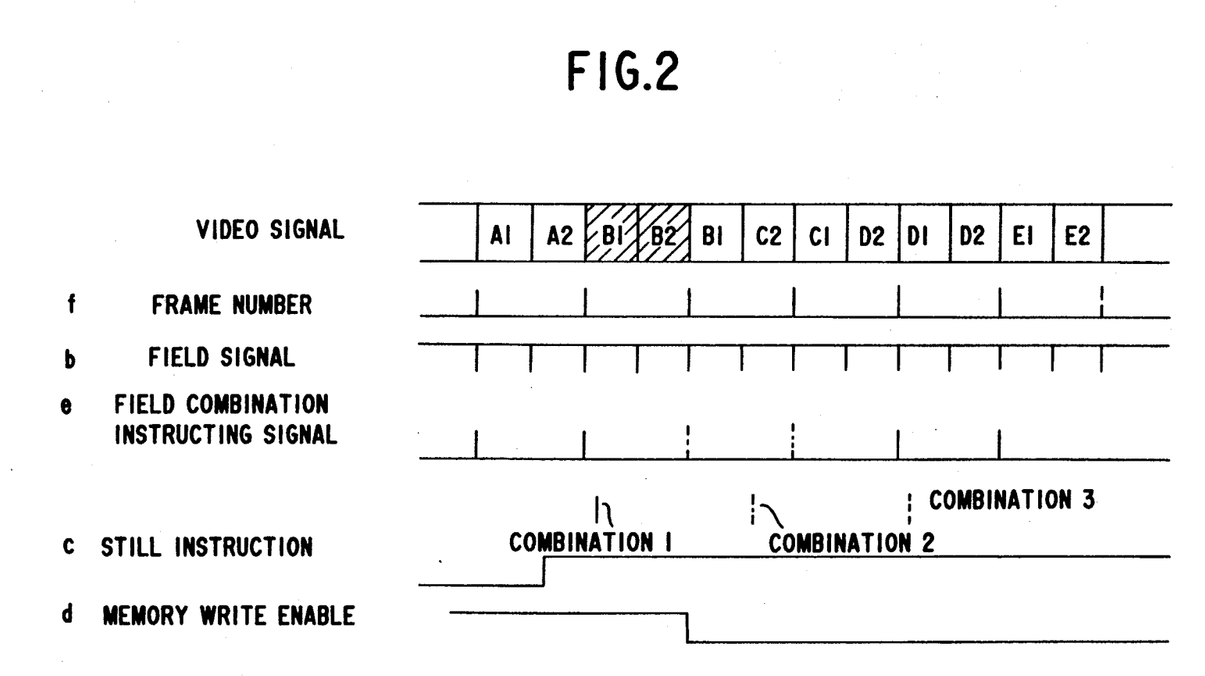
FIGS. 2, 4 and 5 are timing charts showing operations of the system.

As shown in FIG. 2, the frame number f corresponds to the head of each of the frames of the video signal. The field signal b corresponds to the head of each field and the instruction signal e corresponds to the frame number f.

When the still instruction c is applied at the timing shown in FIG. 2, the instruction signal e immediately after the still instruction c instructs the combination 1. Accordingly, the memory controller 11 determines that first and second fields B1, B2 of the first frame after the still instruction are combined as one frame and produces the memory write enable signal d. The frame memory 7 operates to produce the picture in the frame with fields (B1, B2) which is written as a still picture at the last time.

Figure 4:
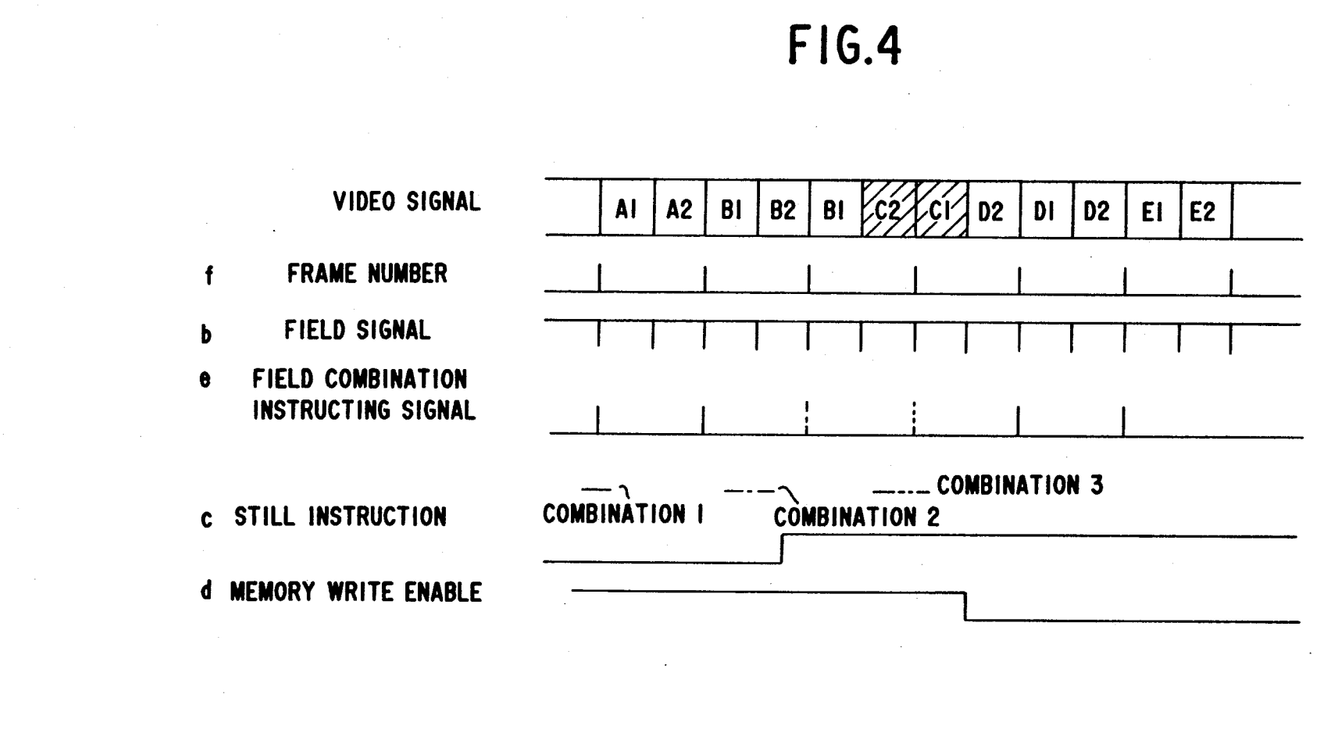

When the still instruction c is applied at the timing shown in FIG. 4, the instruction signal e immediately after the still instruction c represents the combination 2. The memory controller 11 determines that a second field C2 of the first frame and a first field C1 of the second frame are combined as one frame and produces the enable signal d. The memory 7 produces the picture of the frame of fields (C2, C1) as the still picture.

Figure 5:
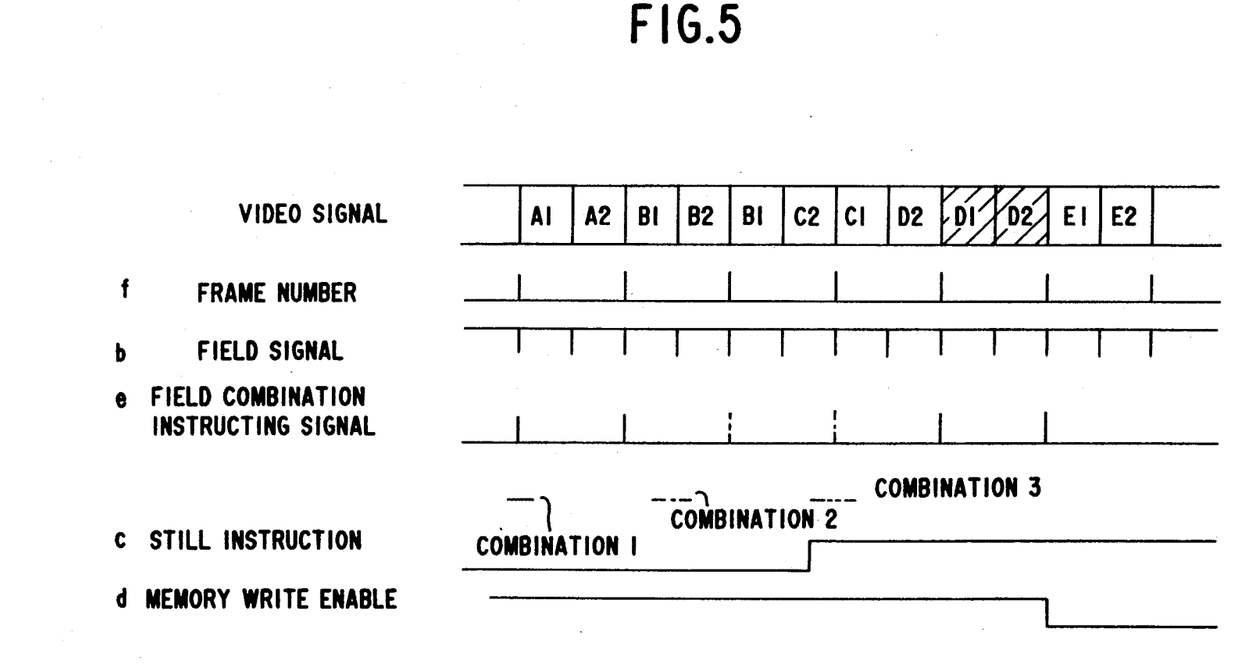

When the still instruction c is applied at the timing shown in FIG. 5, the instruction signal e instructs the combination 3. The picture of the frame of first and second fields D1, D2 of the second frame is produced, accordingly.

Figure 3:
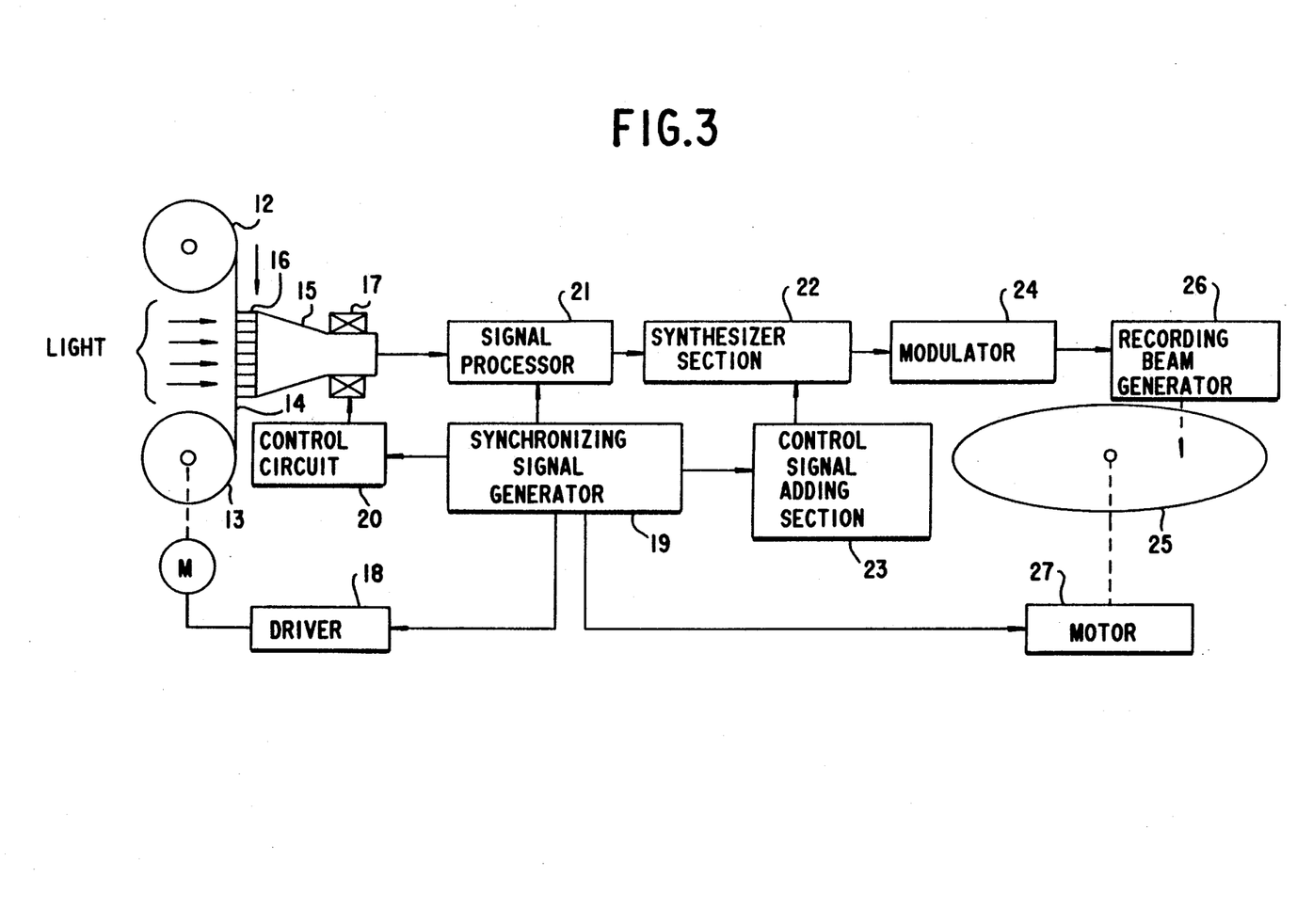
FIG. 3 is a block diagram showing a recording system.

The video signal shown in FIG. 2 is recorded in accordance with a information recording system shown in FIG. 3.

The system has a camera tube 15 for reading information on a motion picture 14 supplied from a supply reel 12 to a winding reel 13. The camera tube 15 is provided with a face plate 16 engaged with the motion picture 14 and a deflection yoke 17. The face plate 16 is made of a bundle of optical fibers having the same dimension as one frame of the film 14. The winding reel 13 is operatively connected to a servo motor M driven by a driver 18 for controlling a feeding timing of the frame of the film. The servo motor M is intermittently driven in accordance with driving pulses produced from the driver 18.

The system is further provided with a synchronizing signal generator 19 for generating a synchronizing signal. A control circuit 20 is provided for supplying a control signal to the deflector yoke 17 in synchronism with the synchronizing signal from the generator 19. A signal processor 21 produces a video format signal. A control signal adding section 23 produces a control signal such as the frame number f, field signal b and instruction signal e in synchronism with the synchronizing signal. The control signal is applied to a synthesizer section 22 to which the video format signal is applied. The synthesizer section 22 operates to synthesize the video signal and the control signal and produces a synthetic signal which is applied to a modulator 24 for modulating the signal. The modulated signal is applied to a recording beam generator 26 for recording the information on a video disk 25. The video disk 25 is operatively connected to a motor 27 which is driven in synchronism with the synchronizing signal.

In the present invention, although the system is provided for recording the information of the film source on the video disk, the information of the video source can be recorded. Further, the system can be employed for a video disk with a recording format such as a PAL system and a SECAM system. The system can also be used for reproducing the video tape. If a track jump is performed when the information is recorded on a CAV disk, the still picture is obtained without fluttering. The system is employed for recording the information on an erasable disk, thereby enabling to edit the insertion. The still picture is obtained at in/out points.

In accordance with the present invention, the frame number and the combination mode instructing signal are inserted in predetermined positions and are referred to during reproduction. Thus, the frame number corresponds to the frame of the video signal of any source and hence the actual time. Further, a code is easily found out during the searching and scanning. Since the system has a code formed by a frame unit, the system is effective to a video signal with a MUSE system and an HD-video disk with 3-disk based band system.

While the presently preferred embodiments of the present invention have been shown and described, it is to be understood that this disclosure is for the purpose of illustration and that various changes and modifications may be made without departing from the scope of the invention as set forth in the appended claims.

What is claimed is:

1. A recording system having reading means for reading information on a film, processing means for producing a video signal from the information read by the reading means, said video signal divided into a series of fields, information in each field derived from a corresponding frame of said film, and recording means for generating recording beams of the video signal for recording the video signal on a video disk, the recording system comprising:

means for inserting a field signal in said video signal at a beginning of each field;

means for inserting a series of frame numbers in the video signal at a beginning of every two fields to form a series of frames; and means for inserting a predetermined number of field combination instructing signals, each of the field combination instructing signals being inserted at a beginning of the frame, and each field combination instructing signal representing a combination of how two adjacent fields, represented by the field signals, are combined which is a different combination from a combination by other field combination instructing signals wherein, said recording means provided for recording said video signal on said video disk based on the inserted frame number, field signals and field combination instruction signals.

2. The system according to claim 1 wherein the predetermined number of the field combination instructing signals are three.

3. A recording and reproducing system having reading means for reading information on a film, processing means for producing a video signal from the information read by the reading means, the video signal being divided into a series of fields, information in each field derived from a corresponding frame of the film, and recording means for generating recording beams of the video signal for recording the video signal on a video disk, the recording and reproducing system comprising:

means for inserting a field signal in said video signal at a beginning of each field;

means for inserting a series of frame numbers in the video signal at a beginning of every two fields to form a series of frames;

means for inserting a predetermined number of field combination instructing signals, each of the field combination instructing signals inserted at a beginning of the frame, and each field combination instructing signal representing a combination of how two adjacent fields, represented by the field signals, are combined which is a different combination from a combination by other field combination instruction signals;

detector means for detecting the field signal, the frame number and the field combination instructing signals;

memory means responsive to a still signal for storing a detected frame number and field signal and a picture in two fields instructed by the detected field combination instructing signal for reproducing a still picture.

* * * * *